(12) United States Patent
Cooper et al.

(10) Patent No.: US 11,159,230 B2
(45) Date of Patent: Oct. 26, 2021

(54) DIGITAL SUBSCRIBER LINE TRANSCEIVER

(71) Applicant: British Telecommunications Public Limited Company, London (GB)

(72) Inventors: Ian Cooper, London (GB); Ian Horsley, London (GB); Leslie Humphrey, London (GB)

(73) Assignee: British Telecommunications Public Limited Company, London (GB)

( * ) Notice: Subject to any disclaimer, the term of this patent is extended or adjusted under 35 U.S.C. 154(b) by 0 days.

(21) Appl. No.: 16/494,159

(22) PCT Filed: Mar. 9, 2018

(86) PCT No.: PCT/EP2018/055950
§ 371 (c)(1),
(2) Date: Sep. 13, 2019

(87) PCT Pub. No.: WO2018/166922
PCT Pub. Date: Sep. 20, 2018

(65) Prior Publication Data
US 2020/0084080 A1    Mar. 12, 2020

(30) Foreign Application Priority Data

Mar. 14, 2017   (EP) ..................................... 17160971

(51) Int. Cl.
*H04B 7/26* (2006.01)
*H04B 3/32* (2006.01)
(Continued)

(52) U.S. Cl.
CPC ............. *H04B 7/2656* (2013.01); *H04B 3/32* (2013.01); *H04L 5/0007* (2013.01); *H04L 5/026* (2013.01);
(Continued)

(58) Field of Classification Search
None
See application file for complete search history.

(56) References Cited

U.S. PATENT DOCUMENTS 10,193,594 B2   1/2019   Al Rawi
10,419,070 B2   9/2019   Horsley
(Continued)

FOREIGN PATENT DOCUMENTS

CN   101119154 A   2/2008
CN   101414870 A   4/2009
(Continued)

OTHER PUBLICATIONS

ITU-T "Fast Access to subscriber Terminals (FAST)—Physical Layer Specification", G.9701, date Dec. 2014 (Year: 2014).*
(Continued)

*Primary Examiner* — Joseph A Bednash
(74) *Attorney, Agent, or Firm* — Patterson Thuente Pedersen, P.A.

(57) ABSTRACT

A digital subscriber line transceiver for transmitting data over a twisted metallic pair using an orthogonal frequency division multiplex technique and employing a time division duplex mode of operation is operable to adopt a plurality of different framing structures including a first framing structure having a frame duration equal to a first predetermined frame duration period and including a downstream set of symbols and an upstream set of symbols, with gaps after each set of symbols summing to a total gap duration of one symbol duration. The different framing structures further include a second framing structure having a frame duration equal to the first predetermined frame duration period and including first and second downstream sets of symbols, first and second upstream sets of symbols and gaps after each of (Continued)

these sets of symbols summing to a total gap duration of an integer number of one or more symbol durations.

14 Claims, 2 Drawing Sheets

(51) Int. Cl.
*H04L 5/00* (2006.01)
*H04L 5/02* (2006.01)
*H04L 27/26* (2006.01)

(52) U.S. Cl.
CPC ...... *H04L 27/2656* (2013.01); *H04L 27/2666* (2013.01)

(56) References Cited

U.S. PATENT DOCUMENTS

| | | | |
|---|---|---|---|
| 2015/0215059 A1 | | 7/2015 | Kerpez |
| 2016/0036491 A1* | | 2/2016 | Sorbara .................. H04L 27/26 370/294 |
| 2019/0281166 A1 | | 9/2019 | Horsley |
| 2019/0288744 A1 | | 9/2019 | Horsley |

FOREIGN PATENT DOCUMENTS

| | | | | |
|---|---|---|---|---|
| CN | 105227326 | A | | 1/2016 |
| CN | 105391493 | A | | 3/2016 |
| CN | 105763292 | A | | 7/2016 |
| CN | 105827276 | A | | 8/2016 |
| EP | 2852068 | | * 3/2015 | ............... H04B 3/32 |
| WO | WO-2009059555 | A1 | | 5/2009 |
| WO | WO2014039004 | | | 3/2014 |
| WO | WO2015150773 | | | 10/2015 |
| WO | WO-2016019378 | A1 | | 2/2016 |

OTHER PUBLICATIONS

European Search Report, Application No. 17160971.2, dated Sep. 20, 2017, 9 pages.
GB Search Report, Application No. 1704069.2, dated Sep. 5, 2017, 5 pages.
Smee, John E, "5G Design across services", URL: http://johannesbergsummit.com/wp-content/uploads/sites/6/2014/11/Tuesday_3_John-Smee.pdf, May 12, 2015.
International Search Report and Written Opinion, PCT Application No. PCT/EP2018/055950, dated May 16, 2018, 15 pages.
Huawei Technologies, "G.fast: Synchronous Time-Division Duplexing Frame Structure; TD2012-05-4A-027", ITU-T Draft; Study Period 2009-2012, International Telecommunications Union, Geneva; Ch, vol. 4a/15, dated Oct. 12, 2012, pp. 1-5.
ITU-T, "Fast Access to Subscriber Terminals (FAST)—Physical layer specification", G.9701, date Dec. 2014, 324 pages.
ETSI TS 136 211 version 10.0.0, Release 10, 3GPP, "LTE; Evolved Universal Terrestrial Radio Access (E-UTRA); Physical channels and modulation", dated Jan. 2011, 105 pages.
Timmers, Michael, "G.fast: Evolving the Copper Access Network", Telecommunications Standards, IEEE, Aug. 2013, 6 pages.
First Office Action dated Sep. 16, 2020 for Chinese Application No. 201880017630.6, 14 pages.
International Preliminary Report on Patentability for Application No. PCT/EP2018/055950, dated Sep. 26, 2019, 8 pages.

* cited by examiner

DIGITAL SUBSCRIBER LINE TRANSCEIVER

CROSS-REFERENCE TO RELATED APPLICATIONS

The present application is a National Phase entry of PCT Application No. PCT/EP2018/055,950, filed Mar. 9, 2018, which claims priority from European Patent Application No. 17160971.2 filed Mar. 14, 2017, each of which is fully incorporated herein by reference.

TECHNICAL FIELD

The present disclosure relates to a transceiver and method of operating such a transceiver. In particular, it relates to a digital subscriber line transceiver and most particularly to a transceiver capable of operating in accordance with the G.fast protocol or a technically similar or equivalent protocol.

BACKGROUND

G.fast is a protocol which is currently under development and is described in the ITU standards G.9700 and G.9701. For the purposes of the present application, the G.fast protocol is considered to be a Digital Subscriber Line (DSL) technology and any modems operating in accordance with it are considered to be DSL modems.

Digital subscriber lines are lines (usually in the form of twisted copper pairs) with Digital Subscriber Line (DSL) modems operating at both ends (of the line). This permits data to be communicated over the line at much greater data rates than is achievable with old voice-band modems operating over the same line and is generally therefore referred to as "DSL broadband". The DSL modems may operate in accordance with any of various DSL standards agreed by the International Telecommunication Union (ITU). Over time newer DSL standards have been (and are still being) developed which permit ever greater data transmission rates to be achieved over digital subscriber lines. For example G.fast (as described in ITU standard G.9701) is currently the highest capability DSL protocol for use with short lines (e.g. from a street cabinet to an end user's premises) which are already commercially in operation in the United Kingdom.

Unlike previous DSL protocols which use Frequency Division Duplex (FDD), G.fast uses Time Division Duplex (TDD). This approach was adopted because it was designed to be used over very short lines (i.e. from a Drop Point Unit (DPU) to a subscriber's premises—lines typically having a length of less than 100 m) so that only a small guard interval (or gap) would be required between upstream and downstream transmissions to prevent upstream/downstream interference. In fact it is now being used over lines of up to 300 m in length which includes most connections between a street cabinet and a customer premises—it appears that the protocol works well over lines of that length despite having originally been designed with shorter lines in mind.

The standards specify that each frame shall comprise a set of downstream symbols and a set of upstream symbols with a guard interval after (or before) each set, the durations of the guard intervals (two per frame) adding to a single symbol duration. The actual wording used in the relevant standard (G.9701 section 10.5) is: "The TDD frame length shall be an integer multiple of symbol periods. One TDD frame period shall consist of $M_{ds}$ symbol periods dedicated for downstream transmission, $M_{us}$ symbol periods dedicated for upstream transmission and a total gap time ($T_{g1}+T_{g2}$) equal to one symbol period; hence $T_F=M_F \times T_{symb}$, where $M_F=M_{ds}+M_{us}+1$. The downstream transmit symbol boundary shall be aligned with the TDD frame boundary. TDD frame lengths of $M_F=36$ and $M_F=23$ symbol periods shall be supported. Additional values of MF are for further study."

SUMMARY

According to a first aspect of the present disclosure, there is provided a transceiver for transmitting data over a twisted metallic pair using an orthogonal frequency division multiplex technique and employing a time division duplex mode of operation, the transceiver being operable to adopt a plurality of different framing structures including a first framing structure having a frame duration equal to a first predetermined frame duration period and comprising a first downstream set of symbols and a first upstream set of symbols with gaps after each set of symbols summing to a total gap duration of an integer number of one or more symbol durations; the different framing structures which the transceiver is operable to adopt further including a second framing structure having a frame duration which is equal to the first predetermined frame duration period, and comprising first and second downstream sets of symbols, first and second upstream sets of symbols and gaps after each of these sets of symbols (i.e. four gaps per frame) summing to a total gap duration of an integer number of one or more symbol durations.

In some embodiments, in the first framing structure (hereinafter also referred to as a two-set framing structure specifying two-set frames) the total gap duration has a duration of one symbol duration, whilst in the second framing structure (hereinafter also referred to as a four-set framing structure specifying four-set frames) the total gap duration can be 2 symbol durations. However, it may be possible in some cases to have a total gap duration in four-set frames of just one symbol duration where all associated lines are of fairly equal and relatively short length.

Naturally, because of delays associated with the transmission over the line, the durations of the gaps are likely to be asymmetrical. For example over long lines the gap between receiving the end of a received set of symbols and commencing transmission of a set of symbols to be transmitted is likely to be much less than the gap between finishing transmitting a set of transmitted symbols and detecting the start of a set of received symbols.

EXAMPLE 1.1

Consider, for example, a frame of duration $36*T_{SYMB}$ where $T_{SYMB}$ is the symbol duration, and a line having a length such that the delay (comprising both path and processing delay) between a signal being transmitted by one transceiver and being received by the other transceiver is $0.5*T_{SYMB}$ (note we are assuming that the delay, D, is symmetrical in upstream and downstream—this need not be the case but the assumption is fine for purposes of the present example). In that case a feasible approach (for a suitable frame timing) would be to transmit (at say the upstream transceiver) a set of Mds=29 downstream symbols, commencing at time $t_0$ and finishing at time $t_0+29*T_{SYMB}$, and then wait for 1 symbol duration (this waiting period constituting a gap, $g_{TRU}$, between finishing Transmission and commencing Reception at the Upstream transceiver) until receipt of the start of the set of Mus=6 upstream symbols at time $t_0+30*T_{SYMB}$. Immediately after finishing receiving the 6th and final upstream symbol at time $t_0+36*T_{SYMB}$, the frame would end and the next frame would immediately begin with the upstream transceiver transmitting a new set of 29 downstream symbols. In this case therefore, the "gap", $g_{RTU}$, between finishing Reception and commencing Transmission at the Upstream transceiver is 0. From the perspective of the downstream transceiver, it would start to receive the first set of 29 downstream symbols at time $t_0+0.5*T_{SYMB}$ (because of the path and processing delay, D of $0.5*T_{SYMB}$). The last symbol would finish being received at time $t_0+29.5*T_{SYMB}$. The downstream (Consumer Premises Equipment (CPE)) transceiver would then immediately (i.e. after a "gap", $g_{RTD}$, between finishing Reception and commencing Transmission at the Downstream transceiver of 0) start transmitting its set of 6 upstream symbols, finishing transmitting the final, sixth, symbol at time $t_0+35.5*T_{SYMB}$. From the perspective of the CPE transceiver, there would then be a gap (gap, $g_{TRD}$, between finishing Transmission and commencing Reception at the Downstream transceiver) of $1*T_{SYMB}$ until receipt of the beginning of the next set of downstream symbols from the upstream transceiver at time $t_0+36.5*T_{SYMB}$ (which the upstream transceiver would have started transmitting at $t_0+36*T_{SYMB}$).

EXAMPLE 1.2

On the other hand, if the path and processing delay were only $0.25*T_{SYMB}$ then an appropriate frame timing might be as follows: to transmit at the upstream transceiver a set of 29 downstream symbols, commencing at time $t_0$ and finishing at time $t_0+29*T_{SYMB}$, and then wait for a gap, $g_{TRU}$, of $0.75*T_{SYMB}$ until commencing receipt of the set of 6 upstream symbols at time $t_0+29.75*T_{SYMB}$. After finishing receiving the $6^{th}$ and final upstream symbol at time $t_0+35.75*T_{SYMB}$, there would be a gap, $g_{RTU}$, of $0.25*T_{SYMB}$ until the frame would end and the next frame would immediately begin with the upstream transceiver transmitting a new set of 29 downstream symbols. From the perspective of the downstream transceiver, it would start to receive the first set of 29 downstream symbols at time $t_0+0.25*T_{SYMB}$ (because of the path and processing delay, D of $0.25*T_{SYMB}$). The last symbol would finish being received at time $t_0+29.25*T_{SYMB}$. The downstream (Consumer Premises Equipment (CPE)) transceiver would then wait for a gap period, $g_{RTD}$, of $0.25*T_{SYMB}$ before starting to transmit its set of 6 upstream symbols at time $t_0+29.5*T_{SYMB}$, finishing transmitting the final, sixth, symbol at time $t_0+35.5*T_{SYMB}$. There would then follow a gap, $g_{TRD}$, of $0.75*T_{SYMB}$ before it would start to receive the first of the downstream symbols in the subsequent frame which the upstream transceiver would have commenced transmitting at $t_0+36*T_{SYMB}$.

Note that in both of the above examples the total gap duration ($g_{RTU}+g_{TRU}$ for the Upstream transceiver and $g_{RTD}+g_{TRD}$ for the Downstream (CPE) transceiver) is $1*T_{SYMB}$ (i.e. $g_{RTU}+g_{TRU}=1*T_{SYMB}$ and $g_{RTD}+g_{TRD}=1*T_{SYMB}$) with the gap ($g_{TRU}$, $g_{TRD}$) between finishing transmitting and commencing reception (at both transmitters) being bigger than the gap ($g_{RTU}$, $g_{RTD}$) between finishing receiving and commencing transmitting (i.e. ($g_{TRU}>g_{RTU}$ and $g_{TRD}>g_{RTD}$). In example 1.1 the "gap", $g_{RTU}$, between finishing receiving and commencing transmission is actually 0 and so there is not actually a gap here at all—however, for present purposes it is to be considered that a gap of zero does actually constitute a gap for the purposes of the present invention. Also note that the shorter the delay (e.g. because of having a short line between the transceivers), the less can be the asymmetry between the gaps (i.e. between $g_{TRU}$ and $g_{RTU}$ and/or between $g_{TRD}$ and $g_{RTD}$).

Also note, that these examples actually use considerably larger path and processing delay figures than are likely to be encountered in practice. These larger than life delay figures have been chosen purely to ease illustration of the principles involved. In fact, the G.9701 standard requires (see G.9701 section 10.5 3rd para "NOTE— . . . ") that the gaps between transmission and reception (i.e. $g_{TRU}$ and $g_{TRD}$ in our notation, corresponding to gaps $T_{g2}$ and $T_{g2'}$ in G.9701), which are the larger gaps, are no bigger than 11.2 µs—that equates to a maximum path and processing delay of about 2.25 µs or about an eighth of a symbol duration (typical symbol duration is about 1/48 000 seconds≈21 µs.—see G.9701 section 10.4.4).

Considering now a second framing structure which embodiments of the present disclosure may have, the second framing structure having a frame duration which is equal to the first predetermined frame duration period, and comprising first and second downstream sets of symbols, first and second upstream sets of symbols and gaps after each of these sets of symbols (i.e. four gaps per frame—note that a gap may span across two adjacent frames—e.g. in example 1.2 above, the gap $g_{TRD}$, between the downstream, CPE, device completing transmission of its six upstream symbols and commencing reception of the downstream symbols in the next frame spans two frames, however, it is considered to be a single gap—notionally, from the perspective of a single frame, one could consider the gap $g_{TRD}$ to comprise a first part from the beginning of the frame at, say, $t_0$ to $t_0+0.25*T_{SYMB}$ and a second part from $t_0+35.5*T_{SYMB}$ up to the end of the frame at $t_0+36*T_{SYMB}$). Unlike the first framing structure described in Examples 1.1 and 1.2, in this second framing structure, the four gaps per frame sum to a total gap duration of two symbol durations rather than one symbol duration. We can consider an example second framing structure and frame timing to complement that of Example 1.1 above to form an Example 2.1 as per below.

EXAMPLE 2.1

As per example 1.1 the frame duration is still $36*T_{SYMB}$. Moreover, the delay (path and processing delay) is still $0.5*T_{SYMB}$. However, in this framing structure there are two sets of downstream symbols (of 11 symbols each in this particular example) and two sets of upstream symbols (of 6 symbols each in this particular example) in each frame with gaps between each set. Thus in this example a feasible approach (for a suitable frame timing) would be to transmit (at the upstream transceiver) a first set of Mds1=11 downstream symbols, commencing at time $t_0$ and finishing at time $t_0+11*T_{SYMB}$, and then wait for 1 symbol duration (this waiting period constituting a gap, $g_{TRU1}$, between finishing Transmission of the 1st set of downstream symbols and commencing Reception at the Upstream transceiver of the first set of upstream symbols) until receipt of the start of the first set of Mus1=6 upstream symbols at time $t_0+12*T_{SYMB}$. Immediately after finishing receiving the $6^{th}$ and final upstream symbol of the first set of Mus upstream symbols at time $t_0+18*T_{SYMB}$, the upstream transceiver would begin transmitting a second set of Mds2=11 downstream symbols. In this case, the "gap", $g_{RTU1}$, between finishing Reception of the $1^{st}$ set of upstream symbols and commencing Transmission of the 2nd set of downstream symbols at the Upstream transceiver is zero. Transmission of the 2nd set of Mds2=11 downstream symbols thus commences at time $t_0+18*T_{SYMB}$ and finishes at time $t_0+29*T_{SYMB}$. At this point, the upstream transmitter again waits for a further period of $1*T_{SYMB}$ (i.e. the third gap in the frame, $g_{TRU2}$, between finishing Transmission of the 2nd set of downstream symbols and commencing Reception at the Upstream transceiver of the 2nd set of upstream symbols is $1*T_{SYMB}$) before commencing reception of the second set (of Mus2=6) upstream symbols (at time $t_0+30*T_{SYMB}$) which reception finishes at time $t_0+36*T_{SYMB}$ and then the next frame would immediately begin with the upstream transceiver transmitting a new set of 11 downstream symbols. In this case therefore, the "gap", $g_{RTU2}$, between finishing Reception of the 2nd set of upstream symbols and commencing Transmission at the Upstream transceiver of the first set of downstream symbols (in the next frame) is also 0.

EXAMPLE 2.1 (Cont.)

From the perspective of the downstream transceiver, it would start to receive the first set of 11 downstream symbols at time $t_0+0.5*T_{SYMB}$ (because of the path and processing delay, D of $0.5*T_{SYMB}$). The last symbol would finish being received at time $t_0+11.5*T_{SYMB}$. The downstream (Consumer Premises Equipment (CPE)) transceiver would then immediately (i.e. after a "gap", $g_{RTD1}$, between finishing Reception of the 1st set of downstream symbols and commencing Transmission at the Downstream transceiver of the 1st set of upstream symbols equal to 0) start transmitting its first set of (6) upstream symbols, finishing transmitting the final, sixth, symbol at time $t_0+17.5*T_{SYMB}$. From the perspective of the CPE transceiver, there would then be a gap (gap, $g_{TRD1}$, between finishing Transmission of the first set of upstream symbols and commencing Reception at the Downstream transceiver) of $1*T_{SYMB}$ until receipt of the beginning of the 2nd set of downstream symbols from the upstream transceiver at time $t_0+36.5*T_{SYMB}$ (which the upstream transceiver would have started transmitting at $t_0+36*T_{SYMB}$).

EXAMPLE 2.2

On the other hand, (as per example 1.2 above) if the path and processing delay were only $0.25*T_{SYMB}$ then an appropriate frame timing for the second framing structure (i.e. the framing structure of Example 2.1) might be as follows: to transmit (at the upstream transceiver) a first set of 11 downstream symbols, commencing at time $t_0$ and finishing at time $t_0+11*T_{SYMB}$, and then wait for 0.75 symbol durations (this waiting period constituting a gap, $g_{TRU1}$, between finishing Transmission of the $1^{st}$ set of downstream symbols and commencing Reception at the Upstream transceiver of the first set of upstream symbols) until receipt of the start of the first set of 6 upstream symbols at time $t_0+11.75*T_{SYMB}$. Then, after finishing receiving the $6^{th}$ and final upstream symbol of the first set of upstream symbols at time $t_0+17.75*T_{SYMB}$, the upstream transceiver would begin transmitting a second set of 11 downstream symbols after a gap, $g_{RTU1}$, between finishing Reception of the $1^{st}$ set of upstream symbols and commencing Transmission of the $2^{nd}$ set of downstream symbols at the Upstream transceiver of 0.25 symbol durations. Transmission of the $2^{nd}$ set of 11 downstream symbols thus commences at time $t_0+18*T_{SYMB}$ and finishes at time $t_0+29*T_{SYMB}$. At this point, the upstream transmitter again waits for a further period of $0.75*T_{SYMB}$ (i.e. the third gap in the frame, $g_{TRU2}$, between finishing Transmission of the 2nd set of downstream symbols and commencing Reception at the Upstream transceiver of the 2nd set of upstream symbols is $0.75*T_{SYMB}$) before commencing reception of the second set (of 6) upstream symbols (at time $t_0+29.75*T_{SYMB}$) which reception finishes at time $t_0+35.75*T_{SYMB}$ and then the next frame would begin with the upstream transceiver transmitting a new set of 11 downstream symbols after a gap, $g_{RTU2}$, between finishing Reception of the $2^{nd}$ set of upstream symbols and commencing Transmission at the Upstream transceiver of the first set of downstream symbols (in the next frame) of 0.25 symbol durations.

Figure 1:
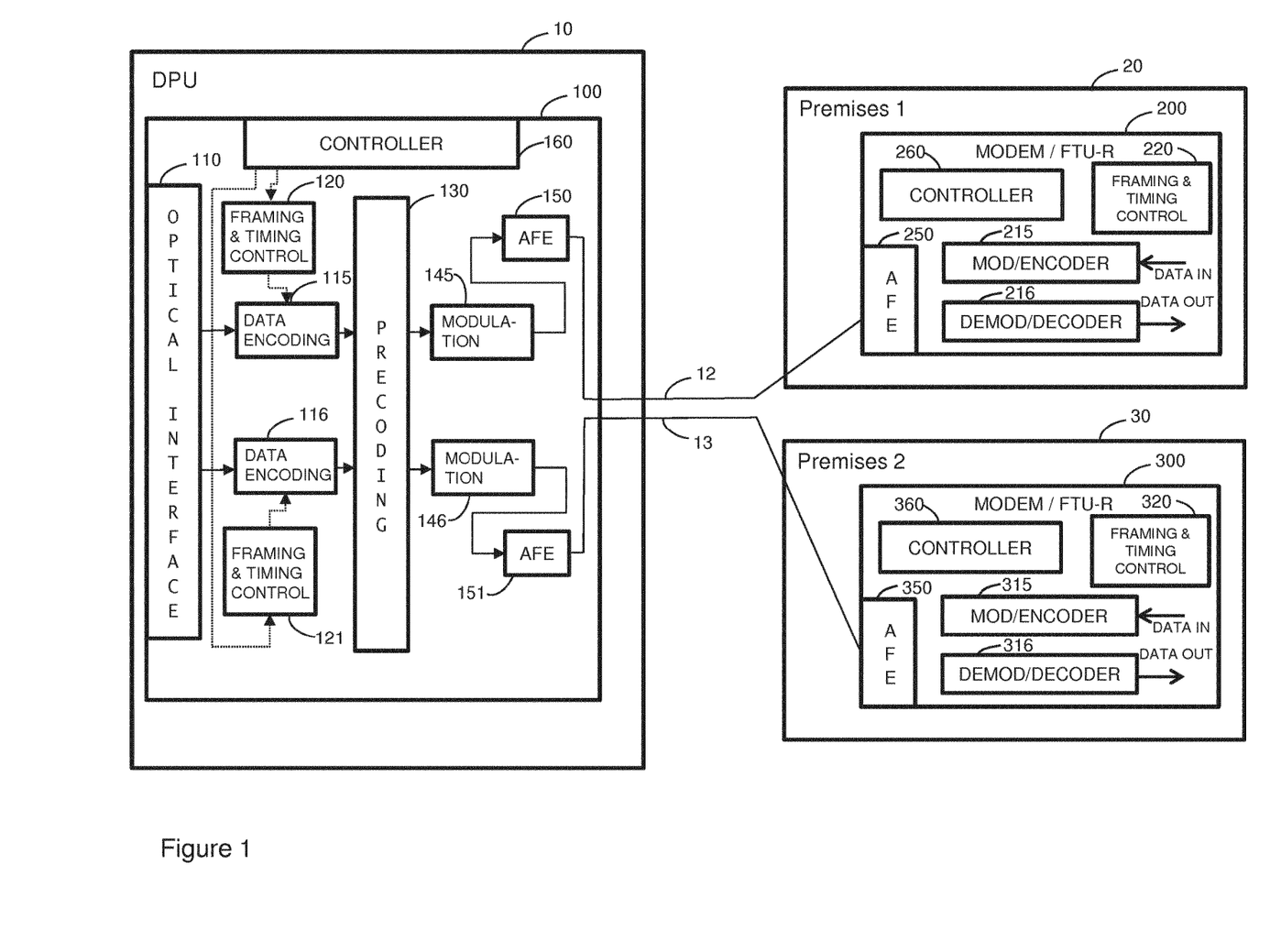
FIG. 1 is a schematic block diagram illustrating a digital subscriber line arrangement comprising a network side DSL transceiver or modem at a Distribution Point Unit (DPU), first and second remote (or CPE) DSL transceivers and a respective copper pair connection between the network side DSL transceiver and the first and second CPE transceivers arranged to operate according to an embodiment of the present disclosure.

Note that in the above examples, the term "upstream transceiver" is being used to refer to the transceiver which is located within an aggregation point within the access network (e.g. the DPU transceiver 100 in FIG. 1) and is therefore "upstream" of the modem to which it is connected (e.g. via a twisted copper pair line such as line 12 or 13 in FIG. 1). The modem to which it is connected is referred to as the "downstream transceiver because it is downstream of the upstream transceiver as it is located closer to the edge of the access network (e.g. the "downstream transceivers" in FIG. 1 are the CPE modems 200 and 300).

Transceivers comprising embodiments of the present disclosure may additionally be operable to adopt further framing structures such as, for example, frame structures having different frame lengths (e.g. having a frame length of 23 symbol durations, $T_{SYMB}$).

Employing first and second different framing structures having different numbers of sets of (contiguous, upstream or downstream), but the same overall frame duration symbols provides some important advantages. In particular, the round trip delay (i.e. the minimum possible time for one transmitter to send a signal and receive a response to that signal is reduced from almost an entire frame duration (in a worst case scenario) to less than half of a frame duration (see FIG. 2 and the detailed discussion of FIG. 2 below). This is particularly important for some applications such as for using copper connections to fronthaul or backhaul mobile network data connections (e.g. 4G/LTE (Long Term Evolution) connections).

It also has the advantage that such a particular line which requires a reduction in round trip delay can use the second framing structure without generating as much interference to neighboring lines employing the first framing structure as would be the case if it adopted a framing structure having a different frame length (e.g. using a framing structure having a frame length of just 23 Symbol durations). Moreover, the second framing structure would achieve a lower round trip delay than the 23 Symbol long framing structure even though it is operating more "politely" than if it were using a 23 symbol long framing structure.

Some embodiments transmit in accordance with the G.fast transmission protocol.

According to a second aspect of the present disclosure, there is provided a transceiver for transmitting data over a twisted metallic pair using an orthogonal frequency division multiplex technique and employing a time division duplex mode of operation, the transceiver being operable to adopt a framing structure having a frame duration equal to a predetermined frame duration period and comprising first and second downstream sets of contiguous downstream symbols, first and second upstream sets of contiguous upstream symbols and gaps after each of these sets of symbols summing to a total gap duration of two symbol durations. In some embodiments, the transceiver additionally operates in accordance with a super-frame structure having a duration equal to a predetermined number, $M_{SF}$, of frame durations of frames according to the framing structure of the second aspect of the present invention (also herein referred to as a four-set framing structure), wherein each super-frame may comprise up to ($M_{SF}-1$) data frames (having a framing structure according to the second aspect of the present invention) and one synchronization frame per super-frame, wherein the synchronization frame has a frame duration equal to the predetermined frame duration period. Each data frame in accordance with the framing structure of the second aspect (as well as each frame according to the first aspect above), can include exactly one downstream Robust Management Channel symbol and exactly one upstream Robust Management Channel symbol in the same way as each of the regular data frames specified in the G.9701 standard (whether as part of the specified 36 symbol duration frame structure or the 23 symbol duration frame structure). Each RMC symbol carries overhead data for maintaining the channel connection—as an example of such data see, for example, G.9701 especially, for example, section 9 and most especially section 9.6 therein.

Operating in accordance with such a super-frame structure and/or with a regular data frame which includes exactly one downstream and exactly one upstream RMC symbol clearly excludes the possibility of considering that a conventional framing structure having just two sets of contiguous symbols (i.e. a conventional "two-set" frame comprising just one set of contiguous downstream symbols and one set of contiguous upstream symbols) could be considered a framing structure according to the third aspect of the present invention if one considered two such (conventional two-set) frames to together constitute a single frame according to the (four-set) framing structure of the third aspect. That is because a "super-frame" comprising two conventional (two-set) super-frames would contain two synchronization frames each of which had half the duration of a "frame" composed of two conventional two-set frames. Alternatively a conventional super-frame deemed composed not of eight 36-Symbol duration TDD frames, one of which is a 36-Symbol duration Synchronization frame, but rather (and completely artificially) is deemed composed of one 72-Symbol duration synchronization frame and 3 72-Symbol duration "regular" TDD frames would also not meet the preferred requirement that each regular data frame should contain exactly one downstream and exactly one upstream RMC symbol, since such "frames" would each contain exactly two downstream and exactly two upstream RMC symbols per "frame".

According to a third aspect of the present disclosure, there is provided a method of transmitting data over a plurality of twisted metallic pairs using an orthogonal frequency division multiplex technique and employing a time division duplex mode of operation, the method comprising providing a plurality of transceivers each being operable to adopt a plurality of different framing structures including a first framing structure having a frame duration equal to a first predetermined frame duration period and comprising a first downstream set of symbols and a first upstream set of symbols with gaps after each set of symbols summing to a total gap duration of an integer number of one or more symbol durations (for example one symbol duration); the different framing structures which each transceiver is operable to adopt further including a second framing structure having a frame duration which is equal to the first predetermined frame duration period, and comprising first and second downstream sets of symbols, first and second upstream sets of symbols and gaps after each of these sets of symbols (i.e. four gaps per frame) summing to a total gap duration of an integer number of one or more symbol durations (for example two symbol durations), the method comprising transmitting data over a first one of the twisted metallic pairs using a first one of the transceivers operating in accordance with the first framing structure and transmitting data over a second one of the twisted metallic pairs using a second one of the transceivers operating in accordance with the second framing structure.

According to a fourth aspect of the present disclosure, there is provided a method of transmitting data over a pair of wires using an orthogonal frequency division multiplex technique and employing a time division duplex mode of operation, the method comprising transmitting and receiving data signals using a framing structure having a frame duration which is equal to a predetermined frame duration period, and comprising within each frame first and second downstream sets of contiguous downstream symbols, first and second upstream sets of contiguous upstream symbols and gaps after each of these sets of symbols summing to a total gap duration of an integer number of one or more symbol durations per frame.

In some embodiments the total gap duration is twice the duration of a single symbol, In some embodiments, as with the first and second aspects above, each frame according to a framing structure of the present invention includes exactly one upstream and one downstream management channel symbols providing overhead data for maintaining the channel (e.g. a Robust Management Channel (RMC) symbol as defined in G.9701.

Further aspects of the disclosure include processor implementable instructions for causing a processor controlled transceiver device to carry out the method of the third or fourth aspects of the present disclosure and carrier means, such as tangible carrier means such as a magnetic or optical storage disc (e.g. a hard drive platter, or a CD or DVD) or a solid state storage device (e.g. a USB mini-drive, etc.), carrying such processor implementable instructions.

Generally, in access network terminology, there is considered to be a downstream and an upstream direction, with Customer Premises Equipment (CPE) being at the most downstream point. DSL modems are sometimes therefore referred to as being either upstream or downstream modems where the downstream modem is the Customer premises side or CPE modem and the upstream modem is the network side or Central Office (CO) modem.

BRIEF DESCRIPTION OF THE FIGURES

In order that the present disclosure may be better understood, embodiments thereof will now be described, by way of example only, with reference to the accompanying drawings in which.

DETAILED DESCRIPTION OF EMBODIMENTS

Referring to FIG. 1, a first embodiment of the present disclosure is illustrated in overview as comprising a Distribution Point Unit (DPU) 10 which contains an Access Node (AN) transceiver 100, a first premises 20 which contains a first Customer Premises Equipment (CPE) transceiver 200 a second premises a customer premises 30 containing a second CPE transceiver 300, a first (metallic) wire pair connection 12 between the AN transceiver 100 and the first CPE transceiver 200 and a second wire pair connection 13 between the AN transceiver 100 and the second CPE transceiver 300. The AN transceiver could be incorporated within a Digital Subscriber Line Access Multiplexer (DSLAM) or some other aggregation device (e.g. a Multiple Services Access Node (MSAN)) comprises a number of network side DSL transceiver ports (outputs/inputs to/from Analogue Front End (AFE) units 150, 151) for connecting to CPE transceivers (also referred to herein as modems). The CPE transceiver/modems 200, 300 on the other hand may well be incorporated in some form of home networking device (e.g. BT's "Home Hub").

DPU transceiver/modem 100 includes standard DSL transceiver components schematically illustrated in FIG. 1 for illustrative purposes only solely from the perspective of the transceiver operating as a DSL transmitter for passing data received at an optical interface component 110 towards the CPE modems in a downstream direction. Naturally, the DPU transceiver is also capable of receiving, detecting and forwarding data from the CPE modems in an upstream direction and forwarding this out over the optical interface 110. However, for brevity, such components have been omitted from FIG. 1 though persons skilled in the art will readily appreciate that generally there are roughly corresponding components within the DPU transceiver 100 to those illustrated in FIG. 1 which operate to convey data in the upstream direction.

Thus, as illustrated in FIG. 1, data received from the optical interface 110 is passed to first and second data encoding components 115, 116 which receive data for transmission to the first and second CPE modem 20 and 30 respectively. As will be immediately apparent to persons skilled in the art, the data encoding components perform typical conventional (digital domain and frequency domain) Discrete Multi-tone (DMT) procedures such as forming the data into suitable sized chunks for transmission, in particular, in order to identify a series of sets of bits for loading onto each tone to be used in a symbol for transmission, and performing a constellation mapping on a tone by tone basis of each chunk of bits to an imaginary number which can be considered as the frequency component value of the frequency corresponding to the respective tone, etc. as per conventional DMT modulation techniques.

Having thus generated frequency component values, the thus encoded data chunks are passed through a precoding module in order to perform some crosstalk cancellation (e.g. zero-forcing vectoring etc.) taking into account the signals that will be travelling on adjacent, cross talking lines such as lines 12 and 13 in the present example. Having performed suitable precoding, the precoded component values are then passed to respective modulation components 145, 146 in which suitable modulation is performed. As will be apparent to persons skilled in the art this will involve performing an Inverse Fast Fourier Transformation (IFFT) to generate a time domain signal including multiple frequency components which can be transmitted orthogonally to one another using a suitable cyclic prefix in the normal well-known manner, the outputs from the modulation components 145, 146 are then passed to respective Analogue Front End components 150, 151 which operate in an entirely conventional manner, for example, to convert digitized time domain samples into a respective analogue signals for transmitting onto the connecting lines 12 and 13 for transmission to the first 200 and second 300 CPE modems in the user premises 20, 30 and to amplify the signals with appropriate line drivers, etc.

When the thus transmitted signals are received at the far end, they are processed in an entirely conventional manner using steps approximately reversed to those performed by the transmitter in a manner well known to the person skilled in the art. This is illustrated in the CPE transceivers of FIG. 1 in which each CPE transceiver comprises an AFE component 250, 350 which primarily samples the received signal to convert it into a digital format and forwards it to a demodulation and decoding component 216, 316 which performs the standard DMT receive functions of converting to the frequency domain using a Fast Fourier Transformation (FFT) and constellation demapping, etc., in order to recover the data.

The CPE transceivers 200, 300 additionally illustrate a modulation and encoding component 215, 315 which performs the opposite of the demodulation and decoding components 216, 316. In brief these map selected bits to an imaginary number in a constellation mapping and then perform an IFFT to convert these to the time domain. The time domain samples are then passed to the AFE 250, 350 which (as per the AFE's 150, 151 in the DPU transceiver 100) filters these to generate an analogue signal and amplifies it in order to drive the signal onto the respective connection 12, 13 back to the DPU transceiver 100.

Each of the transceivers 100, 200, 300 in FIG. 1 is additionally illustrated as containing a controller 160, 260, 360 and framing and timing controllers 120, 121, 220, 320. The controllers 160, 260, 360 perform overall control of the transceivers arranging transitioning between states (e.g. during synchronization or between high and low power states, etc.), communicating signaling information, storing diagnostic data, etc., in the known manner and as specified in the G.fast standards, etc. The framing and timing controllers 120, 121, 220, 320 (which could be included as part of the overall controllers 160, 260, 360 in some implementations) have specific responsibility for ensuring that a framing structure specified by the overall controller is implemented by the transceiver. The exact way in which this is done is dependent upon the preferred method of implementation employed but is generally achieved with suitable software/firmware programmed into the Digital Signal Processor (DSP) or other processor unit of the transceiver in a way that will be apparent to persons skilled in the art. The control includes ensuring that the low level functions of the transmitting and reception as discussed above are timed such that symbols for transmission (i.e. downstream symbols in respect of the DPU transceiver 100 and upstream symbols in respect of the CPE transceivers 200, 300) are transmitted during the designated transmission periods and that received symbols are received during the designated reception periods.

The determination and control of these periods in the present embodiment is discussed in greater detail below with reference to FIG. 2.

Figure 2:
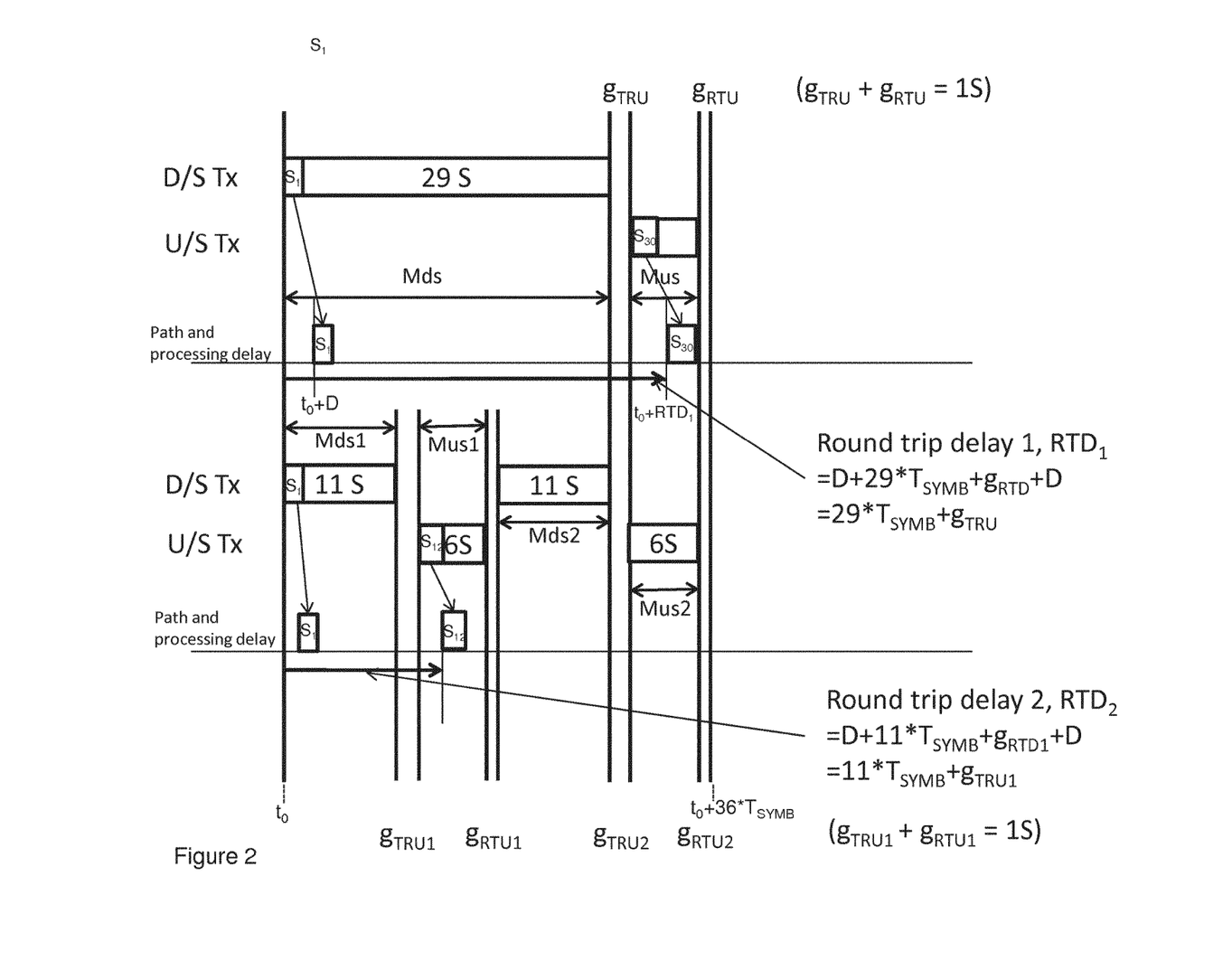
FIG. 2 is a timing chart illustrating a first and a second framing structure employed by embodiments of the present disclosure.

Thus, turning now to FIG. 2, there is illustrated a frame of transmission and reception between the DPU transceiver and the first and second CPE transceivers. The upper portion illustrates a frame of transmission between the DPU transceiver 100 and the first CPE transceiver 200 while the lower half illustrates a frame of transmission between the DPU transceiver 100 and the second CPE transceiver 300. It can readily be seen that in this illustrated example, the DPU transceiver 100 and the first CPE transceiver 200 are communicating in accordance with a conventional frame structure having just one downstream transmission period per frame and one upstream transmission period per frame; this corresponds to the claimed "first framing structure." On the other hand, as illustrated in the lower portion of FIG. 2, the DPU transceiver 100 and the second CPE transceiver 300 are communicating in accordance with a frame structure having two downstream transmission periods per frame and two upstream transmission periods per frame; this constitutes an example in the present embodiment of the claimed "second framing structure."

Firstly, the first framing structure between the DPU transceiver 100 and the first CPE transceiver 200, from the perspective of the DPU transceiver 100 is considered. It can be seen that the frame begins at time $t_0$ with the Upstream, DPU transceiver 100 transmitting Mds=29 Symbols, $S_1$-$S_{29}$. Because of the path and processing delay, D, commencement of reception of this set of symbols at the Downstream first CPE transceiver 200 does not occur until time $t_0+D$. Following Examples 1.2 and 2.2 above, this can be considered to be $0.5*T_{SYMB}$ in the present case. Note that FIG. 2 is not drawn to scale and the illustrated durations of the delay, D, and the symbols $S_1$ and $S_{30}$ and $S_{12}$ have been exaggerated for illustrative purposes. After completing transmission of all Mds=29 downstream symbols, the upstream transceiver 100 waits for a gap $g_{TRU}$ (equal in this case to $0.75*T_{SYMB}$) before commencing reception of the set of Mus=6 upstream symbols, $S_{30}$-$S_{35}$. The upstream transceiver 100 commences reception of these upstream symbols, $S_{30}$-$S_{35}$, at time $t_0+29*T_{SYMB}+g_{TRU}$ where $29*T_{SYMB}+g_{TRU}$ constitutes the round trip delay, $RTD_1$, being the time between commencing transmission at the Upstream transceiver 100 of the first downstream symbol $S_1$ in a frame and commencing reception of the first upstream symbol $S_{30}$ at the upstream transceiver. It can also be seen from FIG. 2 that this round trip delay duration, $RTD_1$ is also equal to $D+29*T_{SYMB}+g_{RTD}+D$.

However, turning now to the second framing structure being used for transmissions between the DPU transceiver (again the upstream transceiver) 100 and the second CPE transceiver (acting as the downstream transceiver) 300, the round trip delay, $RTD_2$, being the time between commencing transmission at the Upstream transceiver 100 of the first downstream symbol $S_1$ in a frame and commencing reception of the first upstream symbol $S_{12}$ at the upstream transceiver 100 from the downstream transceiver 300 is now only $D+11*T_{SYMB}+g_{RTD1}+D$.

It will be apparent that in this example case, the gaps $g_{TRU}$ and $g_{RTU}$ in the first framing structure are aligned with the gaps $g_{TRU2}$ and $g_{RTU2}$ of the second framing structure respectively. It is generally advantageous if at least some of the gaps in the first and second framing structures are aligned in this way.

It will also be apparent from FIG. 2, that for the majority of the frame the DPU transceiver 100 is either transmitting downstream symbols to both CPE transceivers simultaneously or is receiving upstream symbols from both CPE transceivers simultaneously, the only period for which this is not the case is during and between the first and second gaps $g_{TRU1}$ and $g_{RTU1}$ of the second framing structure (during which period the upstream transceiver is transmitting downstream symbols $S_{12}$-$S_{18}$ to the first CPE transceiver 200 and, between the gaps $g_{TRU1}$ and $g_{RTU1}$ of the second framing structure, it is receiving the first set of upstream symbols $S_{12}$-$S_{17}$ from the second CPE transceiver 300 within the second framing structure). It will thus be apparent to persons skilled in the art that this brief period of just 6 symbol periods is the only time during which there may be a worse than normal degree of cross-talk caused by Near-End Cross (X)Talk (NEXT) between the two lines.

Many strategies may be adopted in order to cope with the consequent NEXT issue during this relatively brief period. In particular, it should be borne in mind that the need for the extra upstream transmission period is primarily there in order to enable a fast round trip time to enable messages to be quickly passed between the communicating transceivers and, importantly, also such messages can be quickly responded to. The bandwidth required for such messages is likely to be small. As a consequence it is reasonable to, for example, use quite low modulation complexity for encoding the data. As such, relatively low power signals can be used. For example, if the CPE modem 300 enforced a very low bit loading of just 1 bit per tone, the resultant NEXT interfering with the downstream transmission from the DPU transceiver 100 to the neighboring CPE 200 would be relatively low. Moreover, or instead (as an alternative strategy) some tones where there is low margin on the DPU transceiver to first CPOE modem 200 could be switched off (i.e. set to zero bit loading) for the upstream transmission of upstream symbols $S_{12}$-$S_{17}$ from the second CPE modem 300 to the DPU transceiver 100. Techniques such as these can reduce the negative impacts of NEXT to the neighboring line (or lines where more than one neighboring line is present).

Alternatively, or in addition, the transceivers operating with the first framing structure (i.e. DPU transceiver 100 and the first CPE transceiver 200) could determine different bit loadings to be used for different downstream symbols depending on the position of the symbols within the frame, when it determines that a neighboring line (e.g. line 13 between transceivers 100 and 300) is operating in accordance with the second framing structure (i.e. downstream symbols $S_{13}$-$S_{17}$ transmitted by DPU transceiver 100 over line 12 towards the first CPE transceiver 200) could use a lower bit loading in order to compensate for the worse SNR resulting from the NEXT caused by neighboring line 100, 13,300 transmitting upstream during the transmission of downstream symbols $S_{13}$-$S_{17}$.

The invention claimed is:

1. A transceiver comprising:
  a controller configured to cause the transceiver to transmit data over a twisted metallic pair using an orthogonal frequency division multiplex technique employing a time division duplex mode of operation, wherein the transceiver transmits one or more four-set frames over the twisted metallic pair, each four-set frame having a frame duration equal to a predetermined frame duration period and comprising a first downstream set of contiguous downstream symbols, a second downstream set of contiguous downstream symbols, a first upstream set of contiguous upstream symbols, and a second upstream set of contiguous upstream symbols, and gaps after each of the sets of symbols summing to a total gap duration of an integer number of symbol durations, the downstream sets being interleaved with the upstream sets, wherein the first downstream set of contiguous downstream symbols, the second downstream set of contiguous downstream symbols, the first upstream set of contiguous upstream symbols, and the second upstream set of contiguous upstream symbols are transmitted in one frame period.

2. The transceiver according to claim 1, wherein the transceiver further transmits one or more super-frames over the twisted metallic pair comprising a predetermined number of four-set frames and one synchronization frame per super-frame, wherein the synchronization frame has a frame duration equal to the predetermined frame duration period.

3. The transceiver according to claim 1, wherein each frame includes exactly one upstream management channel symbol and one downstream management channel symbol providing overhead data.

4. The transceiver according to claim 1, wherein the gaps sum to a total gap duration of two symbol durations.

5. The transceiver according to claim 1, wherein the transceiver further transmits one or more two-set frames over the twisted metallic pair, each two-set frame having the same frame duration as each four-set frame and comprising a single downstream set of contiguous downstream symbols and a single upstream set of contiguous upstream symbols with a gap after each of the sets of symbols summing to a total gap duration of an integer number of one or more symbol durations.

6. The transceiver according to claim 1, wherein the predetermined frame duration is thirty six times the duration of a single symbol.

7. The transceiver according to claim 5, the transceiver further performing as an upstream transceiver comprising:
a first port for connection via a first twisted metallic wire pair connection to a first downstream transceiver; and
a second port for connection via a second twisted metallic wire pair connection to a second downstream transceiver,
wherein the transceiver
simultaneously communicates with the first downstream transceiver using four-set frames while the upstream transceiver communicates with the second downstream transceiver using two-set frames, or
simultaneously communicates with the first downstream transceiver using two-set frames while the upstream transceiver communicates with the second downstream transceiver using four-set frames.

8. A system comprising:
an upstream transceiver for transmitting data over a twisted metallic pair using an orthogonal frequency division multiplex technique and employing a time division duplex mode of operation, wherein the transceiver transmits one or more four-set frames over the twisted metallic pair, each four-set frame having a frame duration equal to a predetermined frame duration period and comprising a first downstream set of contiguous downstream symbols, a second downstream set of contiguous downstream symbols, a first upstream set of contiguous upstream symbols, and a second upstream set of contiguous upstream symbols, and gaps after each of the sets of symbols summing to a total gap duration of an integer number of symbol durations, the downstream sets being interleaved with the upstream sets, wherein the first downstream set of contiguous downstream symbols, the second downstream set of contiguous downstream symbols, the first upstream set of contiguous upstream symbols, and the second upstream set of contiguous upstream symbols are transmitted in one frame period; and
a first downstream transceiver and a second downstream transceiver,
wherein:
the upstream transceiver simultaneously communicates with the first downstream transceiver using four-set frames while the upstream transceiver communicates with the second downstream transceiver using two-set frames, or
the upstream transceiver simultaneously communicates with the first downstream transceiver using two-set frames while the upstream transceiver communicates with the second downstream transceiver using four-set frames.

9. A method of transmitting data over a twisted metallic pair of wires using an orthogonal frequency division multiplex technique and employing a time division duplex mode of operation, the method comprising:
transmitting between an upstream transceiver and a downstream transceiver interconnected by the twisted metallic pair of wires one or more four-set frames over the twisted metallic pair, each four-set frame having a predetermined frame duration and comprising a first downstream sets of symbols, a second downstream set of symbols, a first upstream sets of symbols, a second upstream set of symbols, and gaps after each of the sets of symbols summing to a total gap duration of an integer number of one or more symbol durations, wherein the downstream sets are interleaved with the upstream sets, wherein the first downstream set of symbols, the second downstream set of symbols, the first upstream set of symbols, and the second upstream set of symbols are transmitted in one frame period.

10. The method according to claim 9, further comprising:
transmitting one or more super-frames over the twisted metallic pair comprising a predetermined number of four-set frames and one synchronization frame per super-frame, wherein the synchronization frame has a frame duration equal to the predetermined frame duration period and wherein each frame includes exactly one upstream management channel symbol and one downstream management channel symbol providing overhead data.

11. The method according to claim 9, further comprising:
additionally transmitting data between the upstream transceiver and either the downstream transceiver at a subsequent point in time or a further downstream transceiver at a subsequent point in time or simultaneously with transmission of data between the upstream transceiver and the downstream transceiver using one or more two-set frames, each two-set frame comprising a downstream set of symbols and an upstream set of symbols with gaps after each set of symbols summing to a total gap duration of an integer number of one or more symbol durations and having the same frame duration as each four-set frame.

12. The method according to claim 11, wherein the gaps sum to a total gap duration of two symbol durations in each four-set frame and to a total gap duration of one symbol duration in each two-set frame.

13. A method of transmitting data over a first twisted metallic pair of wires and a second twisted metallic pair of wires using an orthogonal frequency division multiplex technique and employing a time division duplex mode of operation, the method comprising:
providing an upstream transceiver and a first downstream transceiver interconnected by the first twisted metallic pair of wires, and further providing a second downstream transceiver connected to the upstream transceiver by the second twisted metallic pair of wires, each transceiver configured to transmit a plurality of different framing structures including:
a two-set framing structure of two-set frames, each two-set frame comprising a downstream set of symbols and an upstream set of symbols with gaps after each set of symbols summing to a total gap duration of one symbol duration, and a four-set framing structure of four-set frames, each four-set frame having the same frame duration as each two-set frame and comprising a first downstream set of symbols, a second downstream set of symbols, a first upstream set of symbols, a second upstream set of symbols, and gaps after each of the sets of symbols summing to a total gap duration of an integer number of one or more symbol durations, wherein the downstream sets are interleaved with the upstream sets, wherein the first downstream set of symbols, the second downstream set of symbols, the first upstream set of symbols, and the second upstream set of symbols are transmitted in one frame period;

transmitting data over the first twisted metallic pair of wires between the upstream transceiver and the first downstream transceiver using the two-set framing structure and simultaneously transmitting data over the second twisted metallic pair between the upstream transceiver and the second downstream transceiver using the four-set framing structure.

14. A non-transitory computer readable storage medium storing computer program instructions which, when executed by a computer system, cause the computer system to carry out the method of claim 9.

\* \* \* \* \*